United States Patent [19]
Josephs

[11] Patent Number: 5,501,297
[45] Date of Patent: Mar. 26, 1996

[54] SAFETY GUARD ASSEMBLY FOR FORK LIFT TRUCKS

[75] Inventor: Harold Josephs, 25311 Ronald Ct., Oak Park, Mich. 48237

[73] Assignee: Harold Josephs, Oak Park, Mich.

[21] Appl. No.: 335,639

[22] Filed: Nov. 8, 1994

[51] Int. Cl.⁶ ..................................................... B66F 9/06
[52] U.S. Cl. ........................... 187/222; 414/914; 280/756
[58] Field of Search ................................... 187/222, 231; 280/756; 296/102, 107, 108; 414/914, 634

[56] References Cited

U.S. PATENT DOCUMENTS

| | | | |
|---|---|---|---|
| 2,806,618 | 9/1957 | Cook | 214/672 |
| 3,188,111 | 6/1965 | Ells et al. | 280/150 |
| 3,259,211 | 7/1966 | Ryskamp | 187/9 |
| 3,336,074 | 8/1967 | Barnes et al. | 280/756 |
| 3,482,869 | 12/1969 | Gardiner | 296/102 |
| 3,827,532 | 8/1974 | Minich, Jr. et al. | 187/9 |
| 3,841,698 | 10/1974 | Stammen | 296/107 |
| 3,844,382 | 10/1974 | Mecklenburg | 187/9 |
| 3,934,679 | 1/1976 | Lieptz | 187/1 |
| 3,941,213 | 3/1976 | Stammen | 187/9 |
| 4,202,565 | 5/1980 | Mosch | 280/756 |
| 4,207,967 | 6/1989 | Stedman | 187/9 |
| 5,042,835 | 8/1991 | Burns | 280/756 |

*Primary Examiner*—Kenneth Noland
*Attorney, Agent, or Firm*—Brooks & Kushman

[57] ABSTRACT

An overhead guard assembly for a pedestrian-operated industrial lift truck maneuvered by an arcuately shiftable handle and a vertically elongated mast supporting an article lifting implement. The overhead guard assembly has a fixed horizontally disposed structural member and a pivotable horizontally disposed structural member mounted adjacent the upper end of the mast. A vertically extending elongated shaft is connected to the pivotable structural member and is operatively connected to a handle by a drive linkage. The drive linkage rotates the elongated shaft as the handle is arcuately rotated whereby the pivotable structural member rotates in tandem with the handle to provide an overhead barrier above the handle and the operator's head.

18 Claims, 2 Drawing Sheets

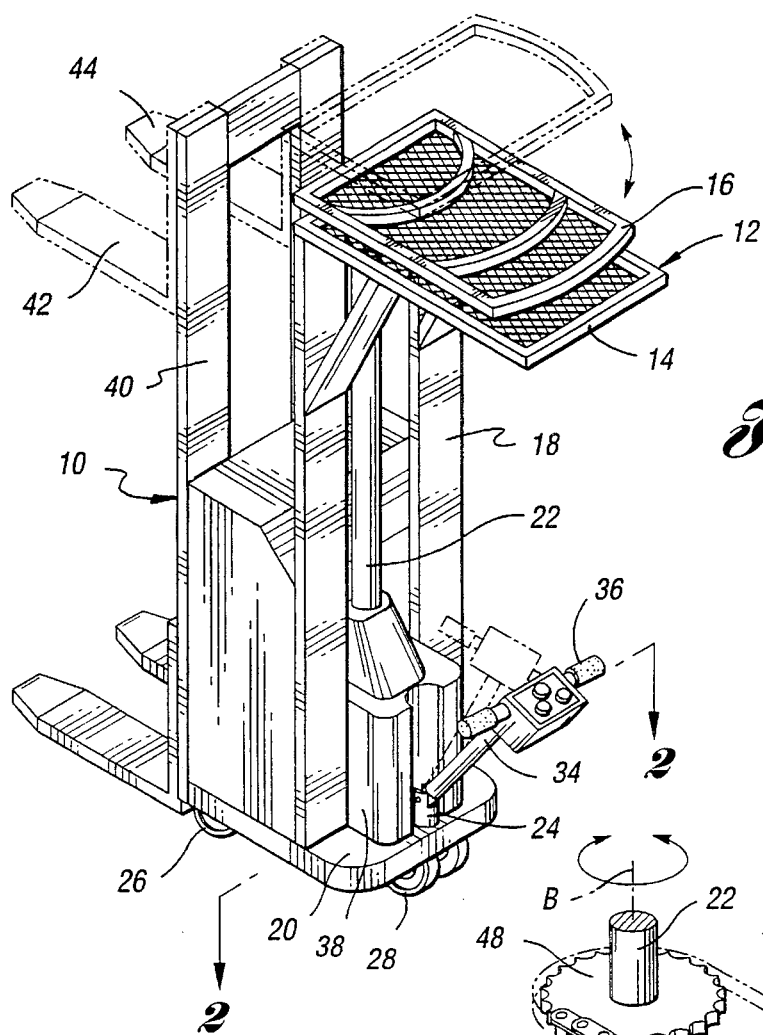
Fig. 1
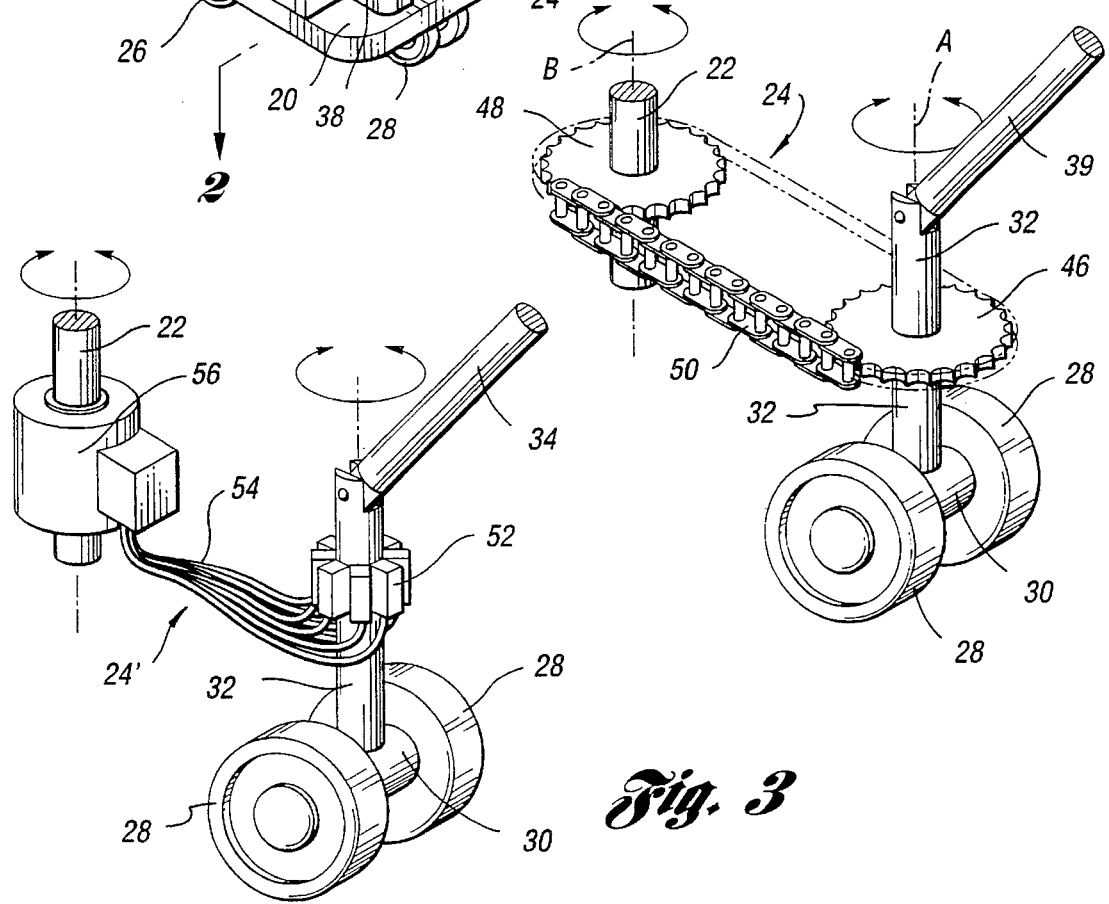
Fig. 2
Fig. 3

SAFETY GUARD ASSEMBLY FOR FORK LIFT TRUCKS

TECHNICAL FIELD

This invention relates to a safety device for an overhead guard assembly which could frequently prevent foreseeable injuries to operators of a pedestrian-operated industrial lift trucks.

BACKGROUND ART

Accidental injuries caused by operation of power-driven machinery and equipment are a serious problem in the workplace. Foreseeable personal injuries have occurred in the use of pedestrian-operated industrial lift trucks when objects fall from raised forks onto operators standing beside the truck.

Pedestrian-operated industrial lift trucks are commonly used in warehouses and other storage facilities to move heavy objects from one area to another. These trucks have a pair of forks or other load handling apparatus mounted on a vertical lift which allows the operator to stack heavy loads at any height. This allows the operator to store loads in vertical tiers in hard to reach places. As cargo is raised above the operator's head by the fork lift, the operator becomes susceptible to injury. Foreseeably, the operator could sustain an injury if cargo that the lift truck mechanism dislodged, was elevating or transporting fell from the forks. This could result in a massive head injury and possibly even death for the operator.

Pedestrian-operated lift trucks are moved and guided by an operator walking or riding alongside or behind the lift truck. The operator controls the lift truck's movements with an arcuately shiftable handle control.

Overhead guard assemblies are provided on many lift trucks currently in use. One such guard assembly is cited in U.S. Pat. No. 3,844,382 to Mecklenburg which discloses a mast-mounted overhead guard for an electric lift truck. The overhead guard is pivotally attached to a vertically extending mast which positions it directly above the operator's station. The device pivots vertically as cargo is raised above the operator's head. The Mecklenburg guard assembly does not protect the operator standing to the side of the truck.

Another type of guard assembly used for industrial lift trucks is disclosed in U.S. Pat. No. 3,934,679 to Lieptz which describes a retractable overhead guard for use on vertical lifting machines which protects an operator from falling material. The overhead guard assembly pivots vertically in response to the vertical positioning of the forks of the lift truck. The Lieptz device does not include any lateral protection to prevent objects being transported by the lift truck from falling on persons standing to the side of the overhead guard assembly. The operator of the pedestrian-operated industrial trucks typically walks or rides alongside or behind the truck which places him in harms way outside the guard coverage area.

Loads transported moved, raised or lowered are often most vulnerable to tipping or dropping when the lift truck is turned or reversed. It is foreseeable that a heavy object being transported on the forks of the lift truck could fall on top of the operator, causing a crushing injury to the operator's head, shoulders, legs, feet or arms, potentially resulting in permanent injuries or even death.

The above stated foreseeable hazards and others establish that there is a long-felt need for a device for preventing injury as a result of the operation of pedestrian-operated industrial lift trucks.

SUMMARY OF THE INVENTION

It is an object of the present invention to provide a simple and inexpensive overhead guard assembly for pedestrian-operated industrial lift trucks which will protect the operator standing beside or behind the lift truck from falling objects during the use of a pedestrian-operated lift truck.

It is another object of the present invention to provide an overhead guard assembly having a simple mechanical linkage which will enable the guard assembly to turn in tandem with the handle control thereby providing the operator protection while manipulating the handle control.

It is a further object of the invention to provide a motor and an electrical position encoder which will turn the overhead guard assembly in tandem with the handle control to provide an overhead barrier for protecting an operator while using the pedestrian-operated lift truck.

Yet another object of the invention is to provide an overhead guard assembly which will provide a fan-shaped barrier for protecting an operator during the use of a pedestrian-operated lift truck.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 is a perspective view of a pedestrian-operated industrial lift truck having a pivoting overhead guard assembly in accordance with the present invention;

FIG. 2 is a fragmentary perspective view of the mechanical linkage of the horizontally shifted overhead guard assembly of the pedestrian-operated industrial lift truck of the present invention;

FIG. 3 is a fragmentary perspective view of motor and electrical position encoder of the horizontally shifted overhead guard assembly of the pedestrian-operated lift truck of the present invention;

BEST MODE OF THE INVENTION

Figure 4:
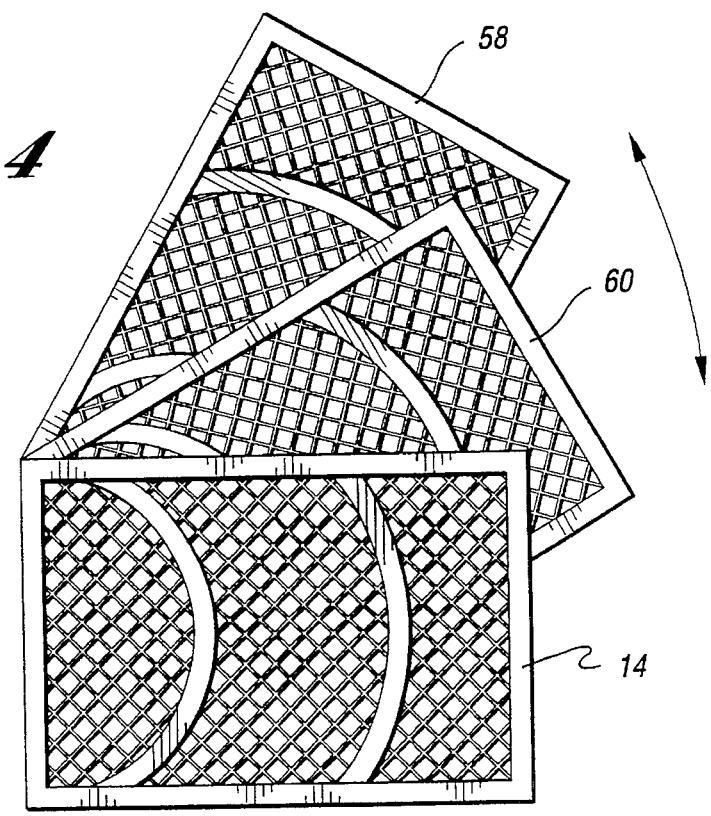
FIG. 4 is a top plan view of an alternate embodiment of the horizontally shifted overhead guard assembly of the present invention.

Referring to FIG. 1, a pedestrian-operated industrial lift truck 10 is shown which includes the overhead guard assembly 12. Overhead guard assembly 12 is made up of a fixed structural member 14 and a pivotable structural member 16. Fixed structural member 14 is attached to a mast 18 which extends vertically from the lower platform 20 of the lift truck 10. An elongated shaft 22 attached to pivotable structural member 16 extends vertically with mast 18 to connect member 16 with drive linkage 24.

The lift truck 10 has a lower platform 20 which is supported by drive wheels 26 and rear wheels 28 in the illustrated embodiment. Other wheel arrangements commonly utilized in pedestrian-operated industrial lift trucks could incorporate the overhead guard assembly 12 of the present invention.

Referring to FIGS. 1 and 2, rear wheels 28 are connected by a drive axle 30 which is attached to a vertical shaft 32 extending to a handle 34. Handle 34 extends rearwardly from the perimeter of lower platform 20. Handle 34 has a hand grip control 36 on its distal end which controls the operation of the motor 38.

A telescoping mast 40 extends vertically from lower platform 20 of lift truck 10. Telescoping mast 40 supports a pair of lifting forks 42, 44 which carry the cargo load. It should be understood that a hook, magnet, shovel or other load engaging device could also be used instead of the forks 42, 44. Guard assembly 12 is positioned directly opposite lifting forks 42, 44 to provide protection for the operator.

In an alternative embodiment of the invention, mast 18 could be eliminated from lift truck 10. The fixed structural member 14 could alternatively be attached to telescoping mast 40. Elongated shaft 22 would extend vertically with the mast 40 to connect pivotable structural member 16 to drive linkage 24.

Referring now to FIG. 2, in one embodiment a mechanical drive linkage 24 is shown in greater detail. Axle 30 is connected to a shaft 32. Handle 34 is pivotally connected to shaft 32. Shaft 32 rotates about an axis "A" in response to handle 34 being turned clockwise or counterclockwise. The rotation of handle 34 is transferred through the shaft 32 which in turn rotates rear wheels 28.

A gear 46 is mounted on and is rotated in tandem with the shaft 32. Another gear 48 is mounted on elongated shaft 22. A chain 50 is connected to both of the gears 46 and 48. Rotation of gear 46 about an axis "B" is transferred to gear 48 by chain 50. Gear 48 turns the elongated shaft 22 which in turn rotates pivotable structural member 16. The pivotable structural member 16 rotates in tandem above the handle 34, providing a broader area of protection from falling objects in combination with the fixed structural member 14.

FIG. 3 illustrates another embodiment of drive linkage 24' for the pedestrian-operated lift truck 10. An electrical position encoder 52 is mounted on shaft 32. The encoder 52 determines the relative rotational position of handle 34. The encoder 52 sends this position information via electrical wires 54 to a motor 56 mounted on elongated shaft 22. Motor 56 rotates elongated shaft 22 in tandem with the rotation of handle 34. The elongated shaft 22 rotates the pivotable structural member 16 to provide a barrier of protection above the operator's head in combination with the fixed structural member 14.

Referring now to FIG. 4, another embodiment of the overhead guard assembly 12 is disclosed. Fixed structural member 14 supports pivotable structural members 58, 60. Pivotable structural members 58, 60 are attached to elongated shaft 22. As elongated shaft 22 is moved by movement of the handle 34, members 58, 60 rotate arcuately upon fixed structural member 14 at their distal ends. Members 58, 60 move relative to fixed structural member 14, to provide an increased continuous area of protection above the operator's head.

Figure 5:
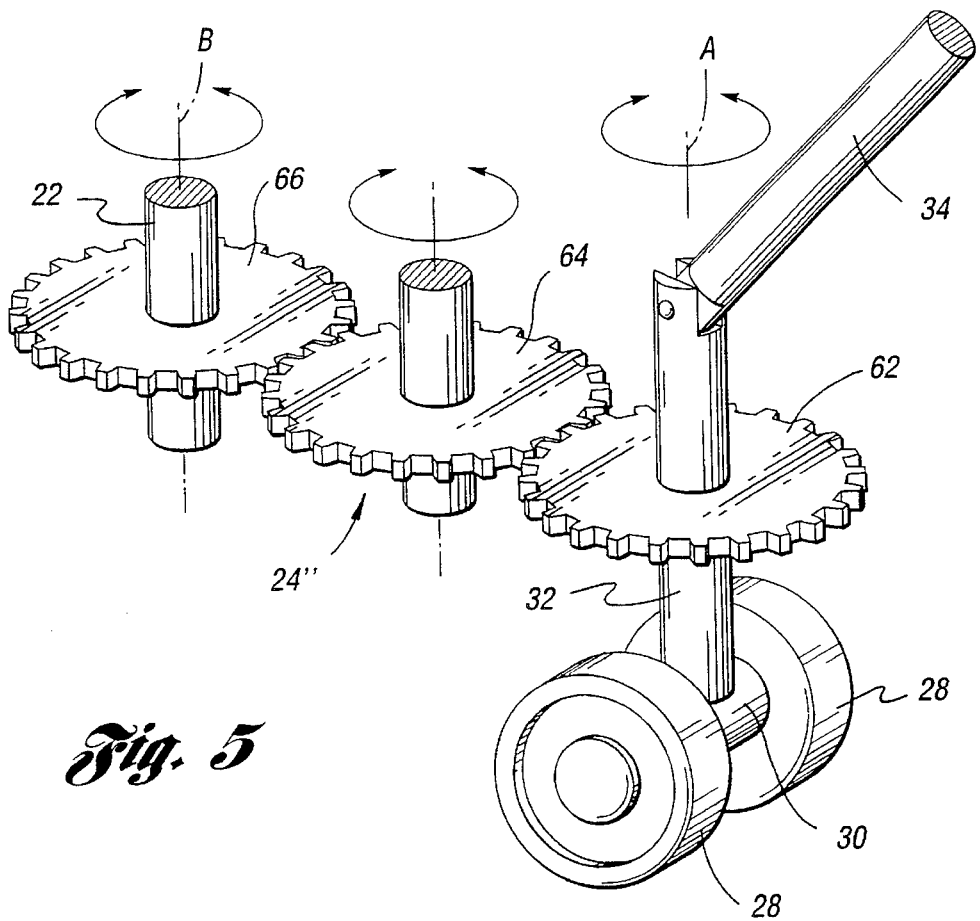
FIG. 5 is a fragmentary perspective view of a gear drive for the horizontally shifted overhead guard assembly of an industrial lift truck of the present invention.

FIG. 5 illustrates another alternative embodiment of the drive linkage 24" wherein elongated shaft 22, which is connected to pivotable structural member 16, is shifted by a series of gears 62, 64, and 66. These gears translate the motion of shaft 32 to shaft 22 and member 16, thereby rotating the pivotable member 16 to a desired position.

While several different embodiments of the present invention are described above, it will be readily appreciated by one of ordinary skill in the art that many other combinations and variations may be used to achieve the simple and effective safety guard of the present invention. The preceding description of different illustrated embodiments should not be read to limit the scope of the applicant's invention which should be construed in accordance with the broad scope of the following claims.

What is claimed is:

1. An overhead guard assembly for a pedestrian-operated industrial lift truck maneuvered by an arcuately shifting handle and a vertically elongated mast supporting an article lifting implement, said guard assembly comprising:

an elongated shaft having a vertical axis, said shaft being rotatable about said vertical axis, said shaft being operatively connected to said handle for rotating said shaft as said handle is arcuately shifted;

a fixed horizontally disposed structural member mounted adjacent the upper end of said mast; and a pivotable horizontally disposed structural member mounted adjacent the upper end of said mast, said pivotable member being operatively connected to said elongated shaft and arcuately movable in a horizontal plane intersecting said vertical axis whereby said pivotable member rotates in tandem with said handle to provide an overhead barrier above said handle.

2. The overhead guard assembly of claim 1 wherein said fixed horizontally disposed structural member is securely fixed to said mast of said pedestrian-operated lift truck.

3. The overhead guard assembly of claim 2 wherein the fixed horizontally disposed structural member extends in the opposite direction from said article lifting implement relative to said mast of said pedestrian-operated lift truck.

4. The overhead guard assembly of claim 1 wherein said pivotable horizontally disposed structural member is positioned directly above said handle of said pedestrian-operated lift truck as it is arcuately shifted 5. The overhead guard assembly of claim 1 wherein said fixed and pivotable horizontally disposed structural members are interconnected at the distal ends of said members, said pivotable member being positioned above said fixed member, said fixed and pivotable members forming a protective web.

6. The overhead guard assembly of claim 1 wherein said elongated shaft is connected to said arcuately shifting handle by linkage means for translating the rotation of said handle to said shaft.

7. The overhead guard assembly of claim 6 wherein said linkage means consists of a plurality of gears, said gears translating the rotation of said handle to said elongated shaft.

8. The overhead guard assembly of claim 6 wherein said linkage means consists of two gears and a chain, said first gear mounted to the axle of said handle and said second gear mounted to said elongated shaft wherein said chain translates the rotation of said handle to said elongated shaft.

9. The overhead guard assembly of claim 1 further including linkage means for rotating said pivotable member with said elongated shaft.

10. The overhead guard assembly of claim 9 wherein said linkage means connects said pivotable member to said elongated shaft by two gears wherein said gears translate rotation between said pivotable member and said shaft.

11. The overhead guard assembly of claim 1 wherein the arcuate shifting of said handle is sensed by an electrical position encoder which generates a signal.

12. The overhead guard assembly of claim 11 wherein said elongated shaft is rotated by a motor in response to the signal generated by the electrical position encoder.

13. An overhead guard assembly for a pedestrian-operated industrial lift truck maneuvered by arcuately shifting a handle, a first vertically elongated mast supporting an article lifting implement, a second vertically elongated mast supporting said overhead guard assembly, an elongated shaft having a vertical axis and being rotatable about said vertical axis, said shaft being operatively connected to said handle for rotating said shaft as said handle is arcuately shifted, a first horizontally disposed structural member mounted adjacent the upper end of said second mast, a second horizontally disposed structural member mounted adjacent the upper end of said second mast, said second member being operatively connected to said elongated shaft and arcuately movable in a horizontal plane intersecting said vertical axis whereby said member rotates in tandem with said handle to provide an overhead barrier of protection above said handle in conjunction with said first member.

14. The overhead guard assembly of claim 13 wherein said pivotable horizontally disposed structural member is positioned directly above said handle of said pedestrian-operated lift truck as it is arcuately shifted.

15. The overhead guard assembly of claim 13 wherein said fixed and pivotable horizontally disposed structural members are interconnected at the distal ends of said members, said pivotable member being positioned above said fixed member, said fixed and pivotable members forming a protective web.

16. The overhead guard assembly of claim 13 wherein said elongated shaft is connected to said arcuately shifting handle by linkage means for translating the rotation of said handle to said shaft.

17. The overhead guard assembly of claim 13 wherein the arcuate shifting of said handle is sensed by an electrical position encoder which generates a signal.

18. The overhead guard assembly of claim 17 wherein said elongated shaft is rotated by a motor in response to the signal generated by the electrical position encoder.

* * * * *